Oct. 24, 1967  R. M. McKINLAY  3,348,791
REFUELING OF ROTARY WING OR VERTICAL TAKEOFF AIRCRAFT
Filed Oct. 11, 1965
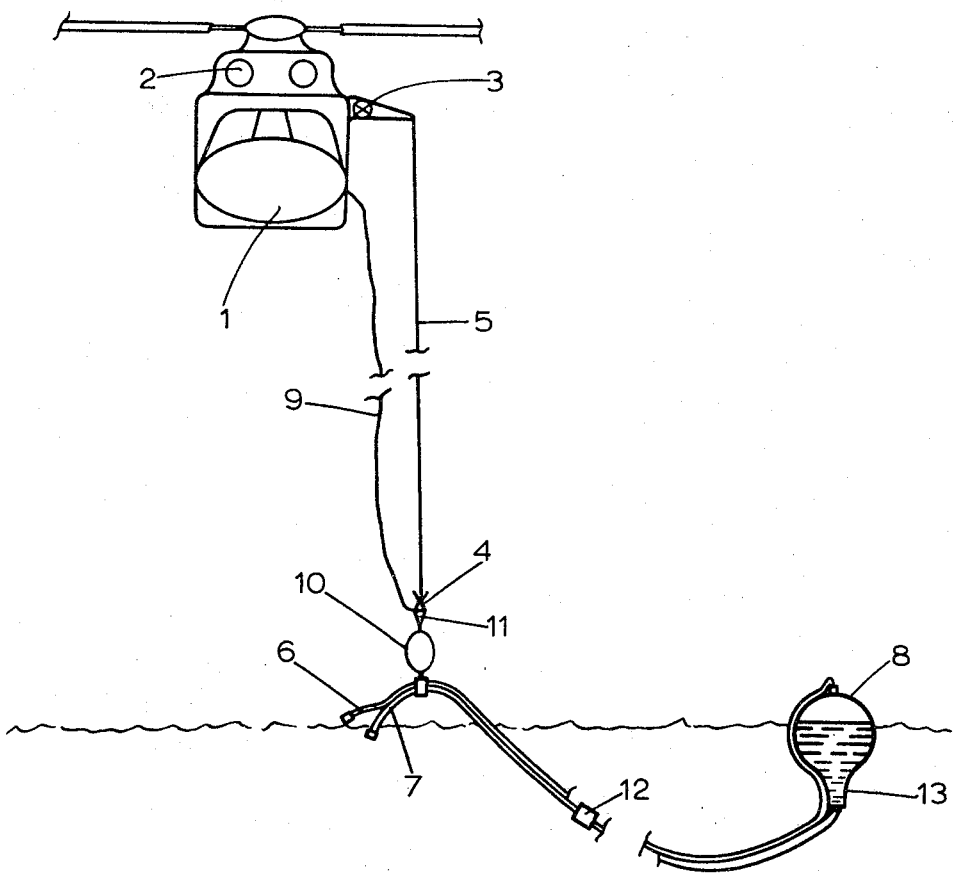

3,348,791
REFUELING OF ROTARY WING OR VERTICAL TAKEOFF AIRCRAFT
Robert M. McKinlay, Yeovil, England, assignor to Westland Aircraft Limited, Yeovil, Somerset, England
Filed Oct. 11, 1965, Ser. No. 494,619
Claims priority, application Great Britain, Oct. 15, 1964, 42,063/64
10 Claims. (Cl. 244—2)

ABSTRACT OF THE DISCLOSURE

Apparatus for transferring fuel from a floating or ground based container to a hovering aircraft, wherein an air pipeline and a liquid pipeline are connected to the top and bottom of the container respectively, and their free ends are connected to a buoy. Winching apparatus in the hovering aircraft enables the pipelines to be grappled and hauled aboard the aircraft, so that the air pipeline can be connected to an air pressure source and the liquid pipeline connected to a fuel tank in the aircraft, thus the buoyant container can be pressurized and fuel transferred to the hovering aircraft from the surface.

This invention relates to refueling aircraft capable of hovering flight, and is particularly, although not exclusively, applicable to refueling helicopters when airborne.

Means known to us of refueling hovering aircraft include the transfer of fuel from one aircraft to another, refueling from a supply ship which provides the pumping means, and the retrieving of fuel bags from the sea or land by means of the aircraft's winch. However, we are unaware of anyone having employed our present method, in which the aircraft provides the pumping means to obtain fuel from an unattended container remaining in a floating or static position.

According to the invention, a hovering aircraft is refuelled by pressurising floating or static fuel storage means with air supplied from means associated with one or more power plants of the aircraft to transfer fuel from the said storage means to the aircraft fuel tanks.

Further objects and advantages of the invention will become apparent from the follownig description of a preferred embodiment, which is by way of example only, and with reference to the accompanying drawing.

To refuel a hovernig helicopter from a floating fuel container, we provide a helicopter 1 having a valved compressed-air conduit connection (not shown) and an aircraft fuel tank connection (not shown), situated near the winchman's position. The conduit supplies compressed air from a compressor of the helicopter's engine 2. A conventional, powered winch 3 is fitted to helicopter 1 and carries a combined grapple and self-engaging hook device 4 on the end of the cable 5. Floating on the water we provide a pressure air line 6 and a fuel line 7 connected to the top and bottom, respectively, of a floating fuel container 8. Pressure air line 6 and fuel lines 7 are constrained to float beside one another and are attached, near their free ends, to a buoyant cord 9 and a buoy 10. Near the point of attachment the cord 9 is secured to a self-engaging coupling 11 and at its free end is secured to a buoy (not shown). Fuel hose 7 has a pressure controller 12 interposed in its length. The bottom of fuel container 8 is formed into a sump 13 which provides the connection for fuel hose 7.

In operation, the helicopter 1 connects with the floating fuel container 8 by trawling the combined grapple and self-engaging hook device 4 across the floating cord 9 to retrieve it and bring it inboard of the helicopter 1. Cord 9 holds the ends of pressure air line 6 and fuel line 7 clear of the water, and the combined grapple and self-engaging hook device 4 is slid down cord 9 and engages self-engaging coupling 11. Pressure air line 6 and fuel line 7 are hoisted to the helicopter 1 and secured to their respective connections (not shown). The transfer of fuel is then effected by compressed air from engine 2 applying pressure in the top of the floating fuel container 8 and forcing fuel up to the helicopter tanks. Sump 13 at the bottom of the floating container 8 is provided to obviate the transfer of air or froth to the helicopter tanks. Pressure controller 12 regulates fuel delivery pressure.

After filling the helicopter tanks cord 9 and lines 6 and 7 are returned to the water.

It will be obvious to those skilled in the art that the floating fuel container may be of rigid or flexible construction and of any convenient shape, while fuel tanks adapted for ground use will require means maintaining them in an upright condition, and the buoys will be substituted by alternative means capable of catching in the combined grappling and self-engaging hook device.

I claim as my invention:

1. An apparatus for transferring fuel from a floating or ground-based fuel container to a hovering aircraft comprising:

a fuel container, a first pipeline in communication with the container near the upper portion thereof, a second pipeline in communication with the container near the lower portion thereof, holding means for connecting together the free ends of the said first and second pipelines, and further apparatus carried by the aircraft including, a source of gas under pressure and means for connecting said source to the free end of the first pipeline, a fuel receiving tank and means for connecting said tank to the free end of the second pipeline, and a winch means including a cable wound thereon, said cable including a grapple means at the free end thereof for retrieving and hauling the first and second pipelines aboard the aircraft for connection to the said source and the said tank respectively, whereby when gas under pressure is fed from the source along the first line to the container, fuel is forced under pressure through the second pipeline to the tank.

2. An apparatus as claimed in claim 1 wherein said container is a floating container, said first and second pipelines are flexible, and said holding means includes a floating buoy.

3. An apparatus as claimed in claim 2 including a buoyant cord connected at one end to the said holding means, and wherein said holding means and the free end of said cable include cooperating elements of a self-engaging coupling whereby when the two said cooperating elements are brought together the said cable engages the said holding means.

4. An apparatus as claimed in claim 1 wherein the said second pipeline includes a pressure controller means mounted thereon for controlling the flow of fuel from the container to the tank.

5. An apparatus as claimed in claim 4 wherein the mean for connecting the first pipe to the source of gas under pressure includes a valve means for controlling the flow of gas under pressure from said source to said first pipeline.

6. Apparatus as claimed in claim 5 wherein the said source of gas under pressure is the aircraft engine, and wherein the said valve means is mounted for controlling the bleed of gas under pressure from the engine to the said first line.

7. An apparatus as claimed in claim 1 wherein the said container includes a sump, and the said second pipeline is connected to the said sump.

8. An apparatus as claimed in claim 1 wherein the said container is formed of a flexible material.

9. Apparatus for transferring fuel from a floating or ground-based container to a hovering aircraft, said apparatus comprising a fuel container, a first flexible pipeline in communication with the uppermost portion of the container, a second flexible pipeline in communication with the lowermost portion of the container, said second pipeline being provided with pressure control means, the free ends of said first and second pipelines being connected to buoy means provided with a self-engaging coupling, said coupling having a buoyant cord attached thereto, further apparatus carried by the aircraft comprising a valved pressure gas connection in communication with a pressure source, a receiving tank connection and winch means provided with grapple means so that said buoyant cord and said first and second pipelines can be retrieved from a water surface by said grapple means and hauled aboard the aircraft whereby a gas pressure connection is made to said first flexible pipeline and a connection to the aircraft's fuel tanks via said second flexible pipeline, so that when said valved gas connection is opened, said container is pressurized and fuel is forced under pressure into the aircraft's tanks.

10. Apparatus according to claim 9, wherein said pressure source is the compressor of a gas turbine engine.

References Cited

UNITED STATES PATENTS

| 2,582,609 | 1/1952 | Steele | 244—135 |
| 2,918,928 | 12/1959 | Rednour | 137—209 |
| 3,057,588 | 10/1962 | Kolbe | 244—135 |

FOREIGN PATENTS

| 642,283 | 5/1928 | France. |
| 995,672 | 6/1965 | Great Britain. |

MILTON BUCHLER, *Primary Examiner.*

FERGUS S. MIDDLETON, *Examiner.*

T. MAJOR, *Assistant Examiner.*